United States Patent [19]
Sage et al.

[11] Patent Number: 5,905,260
[45] Date of Patent: May 18, 1999

[54] TRIBOLUMINESCENT DAMAGE SENSORS

[75] Inventors: Ian C Sage; Norman J Geddes, both of Malvern, United Kingdom

[73] Assignee: The Secretary of State for Defense in Her Britannic Majesty's Government of the United Kingdom of Great Britain and Northern Ireland, United Kingdom

[21] Appl. No.: 09/043,895
[22] PCT Filed: Nov. 11, 1996
[86] PCT No.: PCT/GB96/02778
  § 371 Date: Mar. 30, 1998
  § 102(e) Date: Mar. 30, 1998
[87] PCT Pub. No.: WO97/18451
  PCT Pub. Date: May 22, 1997

[30] Foreign Application Priority Data

Nov. 14, 1995 [GB] United Kingdom .............. 9523240

[51] Int. Cl.$^6$ .................................................. G01N 23/00
[52] U.S. Cl. ................. 250/306; 250/307; 73/105; 252/301.6 F
[58] Field of Search .................... 250/306, 307; 73/105; 252/301.6 F

[56] References Cited

U.S. PATENT DOCUMENTS 4,772,417  9/1988  Pappalardo et al. ............. 252/301.6 F
5,581,082  12/1996  Hansma et al. .................. 250/306

Primary Examiner—Frank G. Font
Assistant Examiner—Roy Punnoose
Attorney, Agent, or Firm—Nixon & Vanderhye P.C.

[57] ABSTRACT

A damage sensor for detecting damage within a structure such as aircraft wings or fuselage, or a bridge. The sensor comprises a small piece of a triboluminescent material connected via light guiding fibres or layers to one or more detectors. The sensor may be embedded within the structure or mounted on its surface. Impact of objects on the structure causes a physical damage to the triboluminescent material. Such damage causes light emission which is detected and recorded for later observation. The intensity of emission may be measured to give an indication of amount of damage received by the structure. Several different triboluminescent materials may be arranged in different location within the structure so that location of damage may be detected by a single detector sensitive to the different wavelengths of light emitted by the several materials. Light from the triboluminescent material may be detected directly by the detectors. Alternatively, material doped with suitable photo excitable dyes may be caused to photo excite, and the resultant light output detected.

8 Claims, 5 Drawing Sheets

TIME (in secs)

TIME

TRIBOLUMINESCENT DAMAGE SENSORS

This invention relates to damage sensors in which materials capable of responding to physical damage are embedded in or attached to structures such as aircraft parts, buildings, or bridges subjected to abnormal loads including earth movements.

Presently, a number of techniques are used to monitor stress within structures and include, pressure sensitive foil sensors and in some cases embedded fibre optics, where stress leads to a definite change in capacitance, resistance, or optical signal respectively.

Structures such as plastic composites in aircraft can be subjected to impacts which cause hidden damage leading to failure if not detected, repaired or replaced. It is often a time consuming process to locate the exact area where damage has occurred, particularly in large structures such as aircraft in order that repair can take place.

The above problem is solved according to this invention by the use of triboluminescent (TL) materials embedded within or attached to structures, together with light guiding means for directing light output from the TL material to detectors.

Triboluminescent material give off light when stressed to fracture levels. Thus by detecting the amount of light, a measure of damage to adjacent structures may be determined.

According to this invention a damage sensor in combination with a structure requiring damage detection comprises at least one triboluminescent material element located at an area of the structure requiring damage detection and at least one light detector together with light guiding means connecting between the element and the detector, the arrangement being such that both location and amount of hidden damage between a predetermined known threshold value and observable failure of the structure may be determined.

The light sensor may be connected directly to the triboluminescent material or via light guiding means such optical fibres.

The sensor may be embedded within a structure, such as a composite plastics material, or fixed externally to such structure. Several sensors may be embedded within one structure. Light output from the triboluminescent material may be detected directly, or such light output may be absorbed by photo excitable dye material whose subsequent luminescence is detected. Different triboluminescent material and or different dyes may be used in different parts of a structure so that damage location is readily determined from the wavelength of emission. The detector may be directly connected to each different triboluminescent or dye material, or one or more detectors used with filters or wavelength detection means to determine the location of damage at several sites.

Additionally the damage site may be located by timing receipt of pulses. The intensity of emission may also be measured to give an indication of the severity of impact and hence damage.

The light guiding means may be single or multimode optical fibres, optical transparent sheet or slab within a composite material. The sheet material may have waveguides defined by rib, indiffusion, or etching etc. and may contain secondary emitters.

The detectors may be photo multipliers, photo diodes, as single detectors or in arrays.

The invention will now be described, by way of example only, with reference to the accompanying drawings of which:

Figure 8:
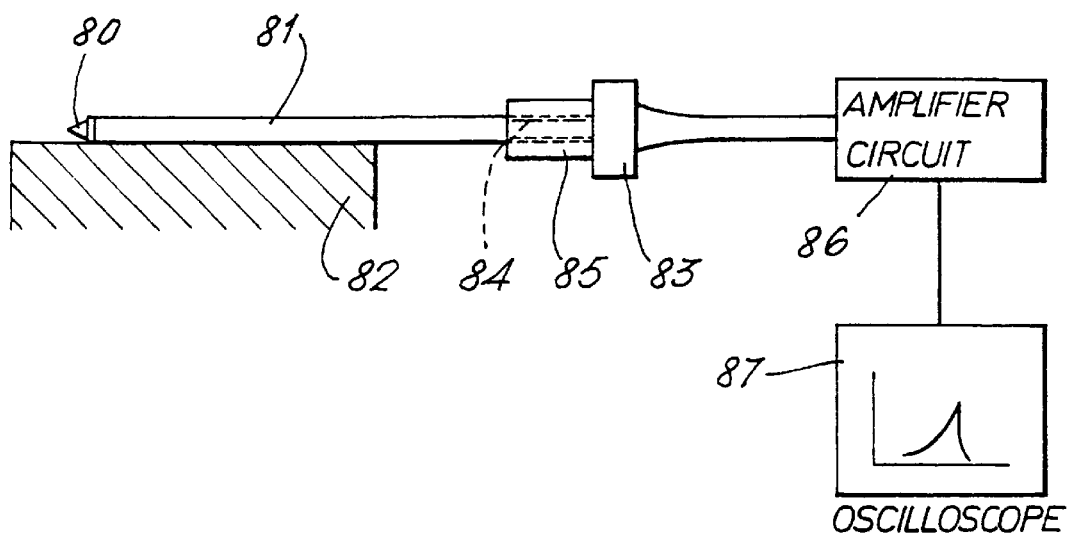
Figure 9:
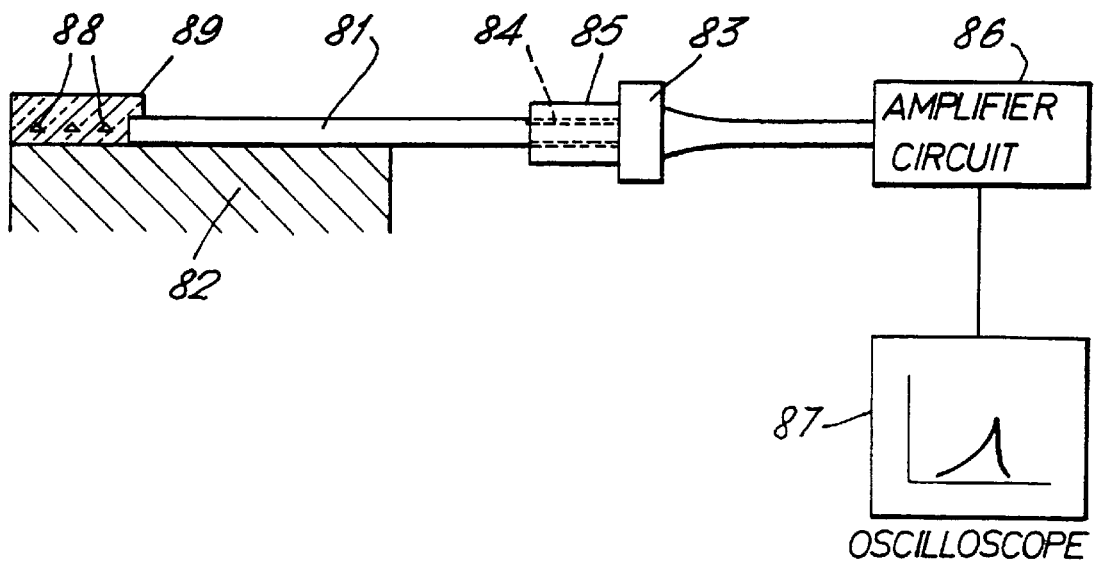
Figure 10:
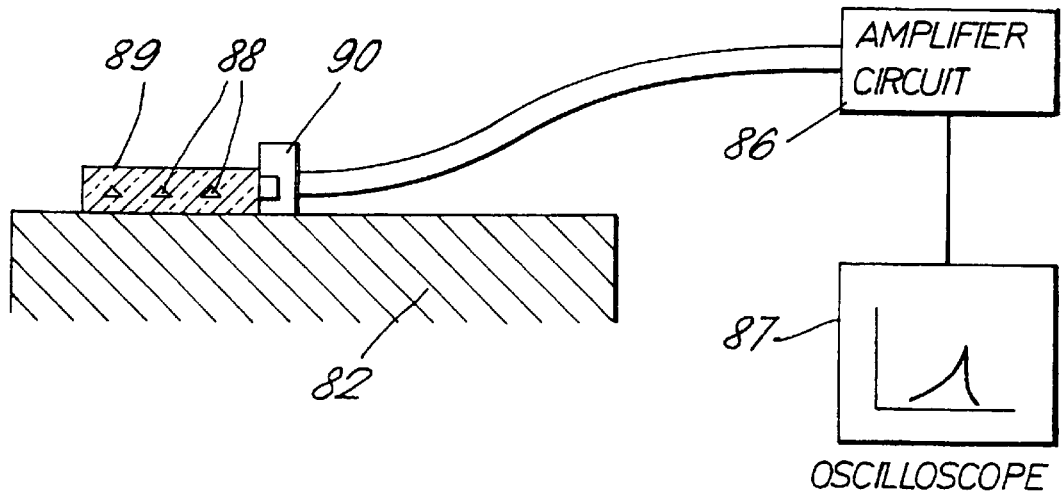
Figure 11:
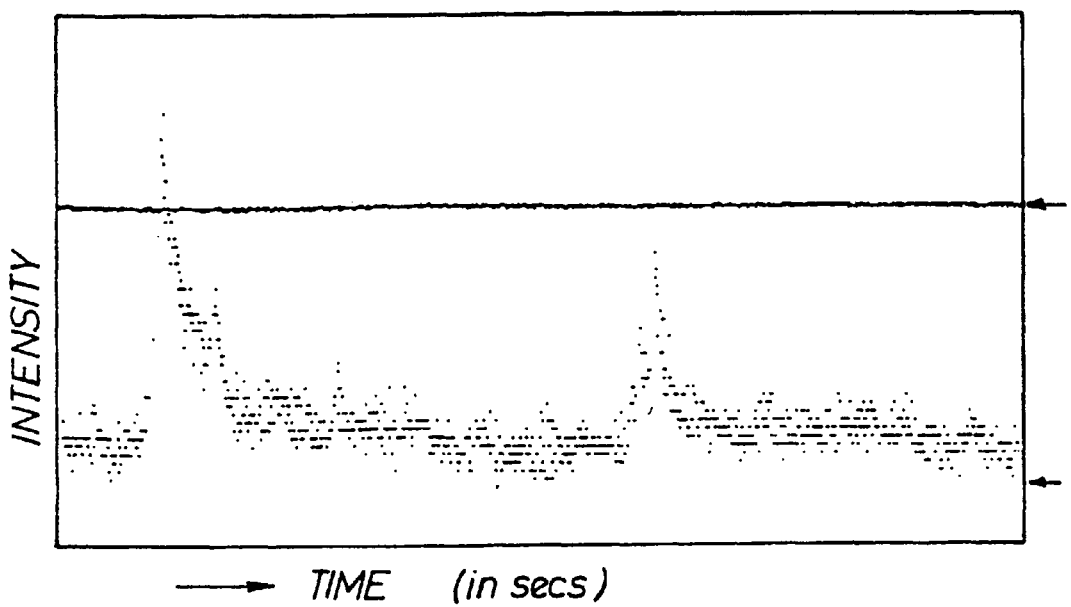
Figure 12:
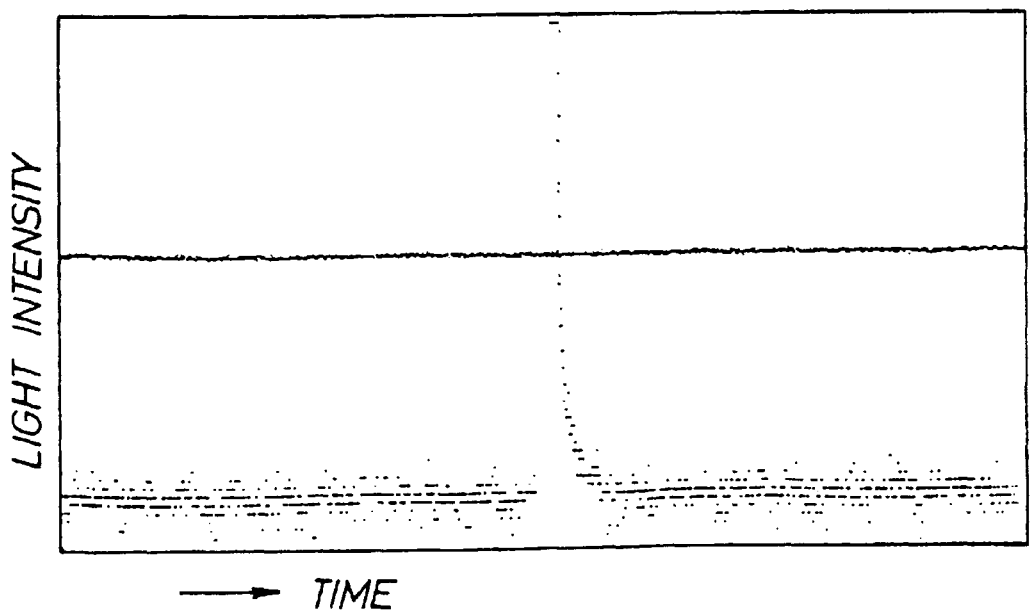

FIGS. 8, 9, and 10 are views of three specific examples used to obtain results as in FIGS. 11, and 12;

FIG. 11 is a graph showing light output against time measured by the arrangement of FIG. 8; and FIG. 12 is a graph showing light output against time measured by the arrangement of FIG. 10.

Figure 1:
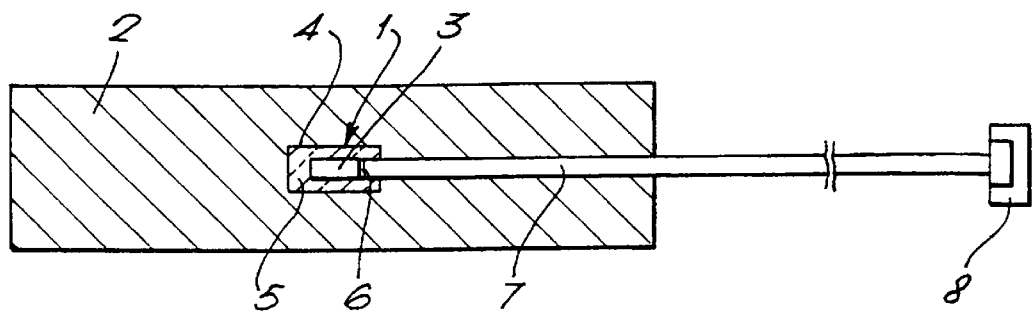
FIG. 1 is a sectional view of a sensor embedded within a structure.

As seen in FIG. 1 a sensor 1 is embedded in a composite material 2 such as a glass or carbon fibre matrix layered material. The sensor 1 comprises a small crystal 3 of a triboluminescent (TL) material such as a europium complex held within a cavity 4 by epoxy resin 5 and optically connected by optical cement such as a UV curing glue 6 from the Norland [TM] range to an optical fibre 7 which transmits light to an externally mounted detector 8. This detector 8 may be a photo diode or part of an array linked to several crystals.

The composite material 2, may have different triboluminescent materials 3 with their characteristic emissions arranged at different positions within the composite 2. The detectors 8 detect such different wavelengths thereby giving positional information about damage location.

The triboluminescent crystal 3 may be:—Coumarin, phenanthrene, acenaphthence, resorcinol, m-aminophenol, aniline, hydrochloride, phthalic, anhydride, triphenylamine, p-anisidine, europium/terbium/manganese coordination complexes, cis-4-octene, uranyl nitrate hexahydrate, menthol, 9-anthrylmethanol [L M Sweeting & J L Guido, J. of Luminescence, 33, (1985), p 167] various carbazoles [N Kitamura et al. Chem Phys Letts. 125, (1986), p360], zinc sulphide doped with luminescent impurities, uranyl nitrate, sucrose and sacharides, and the alkali halides such as sodium fluoride or lithium fluoride.

The tetrahedral manganese (II) complexes (for instance bis-triphenylphosphine oxide manganese II bromide) have received much attention due to their strong triboluminescence which has been related to their crystalline form [B P Shandra, et al Pramana-J Phys. 29, (1987), p399]. Some of the most intense triboluminescent emissions have been observed from europium tetrakis (dibenzoylmethide) triethylammonium [C R Hurt. et al Nature, 212, (1966), p179; L M Sweeting & A L Rheingold, J Am Chem Soc. 109,(1987), p2652] and 1,2,5-triphenylphosphole [M B Hocking, et al. J. of Luminescence, 43, (1989), p309], in these materials luminescence can be observed in relatively bright conditions and emissions continue until crystals are crushed to a fine powder.

The following summary indicates the wavelength of the main peak or peaks in the triboluminescent spectra of different substances when stressed to fracture.

| 300–400 nm wavelength. | |
| --- | --- |
| Nitrogen spectra: sucrose.menthol.lithium sulphate:anhydrous | |
| resorcinol | (peak at 310 nm) |
| m-aminophenol | (peak at 330 nm) |
| acenaphthene | (peak at 350 nm) |
| p-anisidine | (peak at 360 nm) |
| saccharin | (peak at 370 and 480 nm) |
| phthalic anhydride | (peak at 380 nm) |
| triphenylamine | (peak at 380 nm) |
| m-nitrobenzonitrile | (peaks at 340, 365 and 430 nm) |
| 400–500 nm wavelength. | |
| phenanthrene | (peaks at 410 and 435 nm) |
| 9-anthrylethanol | (peak at 430 and 460 nm) |
| coumarin | (broad peak at 420 nm) |
| N-acetylanthranilic acid | (peak at 420 nm) |
| nicotinium salicylate | (peak at 420 nm) |
| 500–600 nm wavelength | |
| 1.2.5-triphenylphosphole | (peak at 510 nm) |
| uranyl nitrate hexahydrate | (strong peaks at 520 and 540 nm) |
| hexaphenylcarbodiphdsphorane | (peak at 520 nm) |
| phenanthrene | (peak at 540 nm) |
| 600–700 nm wavelength | |
| europium chelates | (strong peak at 612 nm) |
| [CH$_3$NH$_3$]$_3$Mn$_2$Cl$_7$ | (peak at 650 nm) |

In operation, eg in an aircraft impact of objects on the composite 2 above a predetermined known energy level will damage the crystal 3 causing it to emit light; high impact energy results in higher light output. The detected light may either be transmitted as a signal directly to the pilot if a serious damage had occurred or stored by computer and read by a maintenance crew at a later stage for damage repair. If the recorded detection indicates composite damage, then that part of the composite may be repaired or replaced before the next aircraft flight.

Thus several different materials constructed as in FIG. 1 may be used as shown in different parts of a structure and a single detector used. In this case the detector must be able to distinguish different wavelengths to indicate which area of the structure has received damage.

Figure 2:
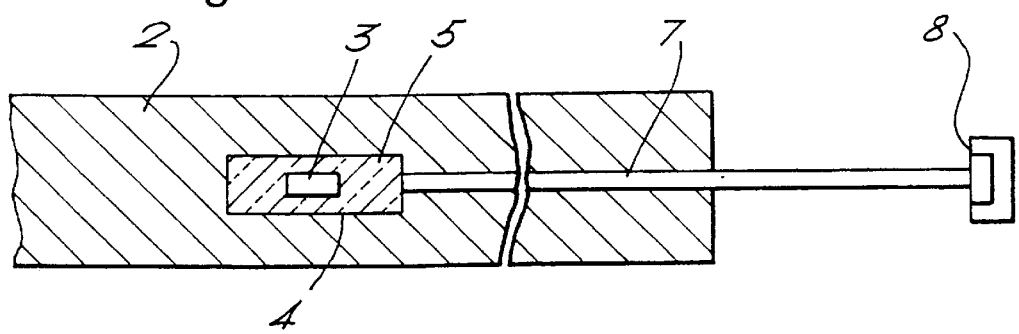
FIG. 2 is similar to and a variation of FIG. 1.

FIG. 2 is similar to FIG. 1 and given like reference numeral. In this example the optical fibre 7 optically connects to glue 5 holding the crystal 3 within the cavity 4. The glue 5 is optically transparent and may be a polymer matrix.

Figure 3:
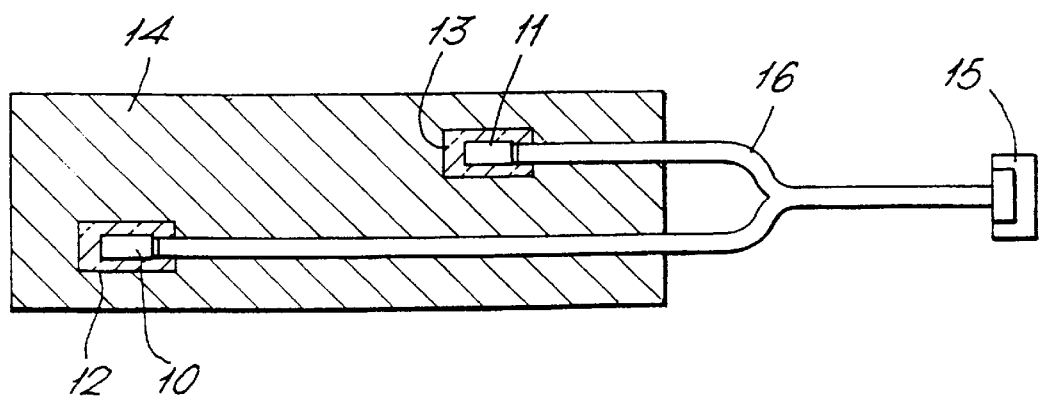
FIG. 3 is a sectional view of two sensors embedded within a structure, with optical fibre readout to a single detector.

FIG. 3 shows different TL crystals 10, 11 (two only shown, but may be many more) located in cavities 12, 13 in different parts of a composite material 14. A single detector 15 connects with each crystal 10, 11 via an optical fibre network 16 and is sensitive to the different emissions of the crystals 10, 11, and can therefore indicate the location of any damage. Such an arrangement reduces the number of cavities needed within the composite material 14.

Figure 4:
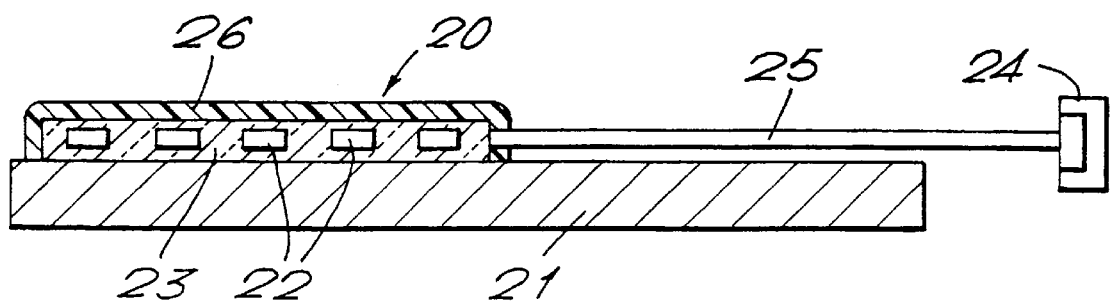
FIG. 4 is a sectional view of a sensor mounted on a surface of a structure.

FIG. 4 shows how a sensor 20 can be mounted externally on a composite material 21. As before one or more TL crystals 22 are encapsulated within an optically transparent glue or resin 23 and coupled to a detector 24 via an optical fibre 25. When a plurality of different crystals 22 are used, the detector 24 is arranged to distinguish between their different emissions wavelengths to give an indication of damage location. A protective layer 26 of opaque material covers the glue 23.

Figure 5:
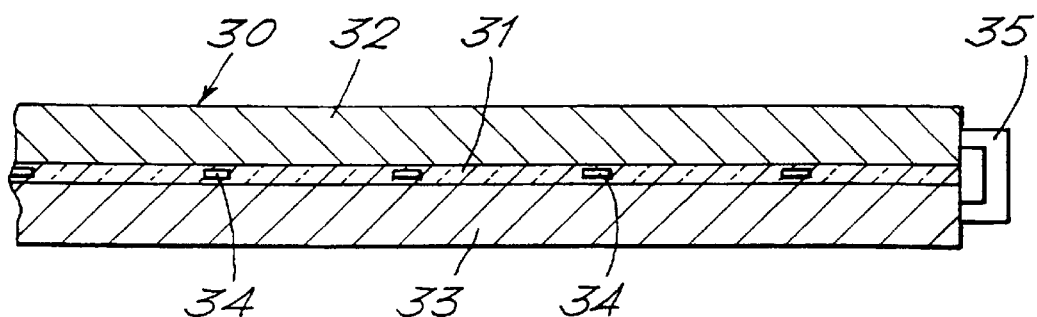
FIG. 5 is a sectional view of several triboluminescent materials and a light guiding layer embedded within a structure.

FIG. 5 shows a composite material 30 in which a layer 31 of a guiding material is sandwiched between two layers 32, 33. Embedded within the light guiding layer 31 are one or more TL crystals 34. A detector 35 is mounted on the edge of the composite material 30. Suitable materials for the light guiding layer 31 are:—UV curing glues, sol-gel, optically transparent polymers, resins or glues.

Figure 6:
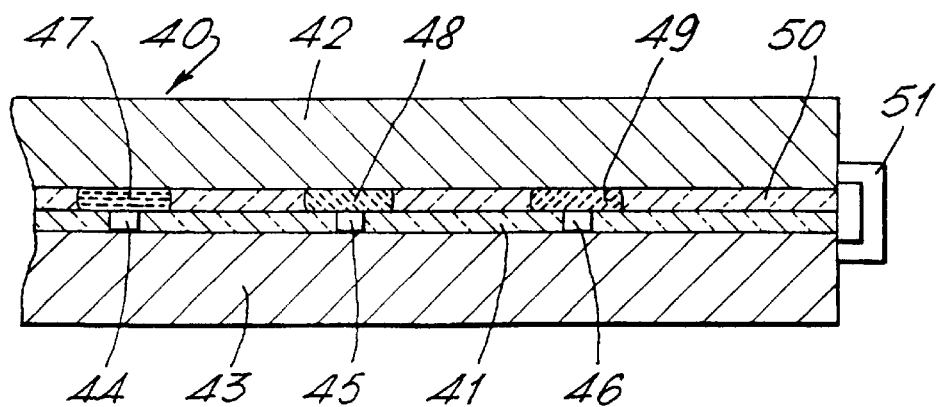
FIG. 6 is similar to that of FIG. 5, but in addition has a different photo excitable dye associated with each triboluminescent material.

FIG. 6 shows a composite material 40 in which a layer 41 of a light guiding material is sandwiched between two layer 42, 43. Embedded within the layer 41 are three TL crystals 44, 45, 46. Above each crystal 44, 45, 46 is a volume of three different photo excitable dye 47, 48, 49 contained within a second layer 50 of a light guiding material. A detector 51 is sensitive to the outputs of each dye volume 47, 48, 49. When damage occurs, an appropriate crystal 44, 45, 46 will emit light and cause an associated dye volume 47, 48, 49 respectively to emit light at a characteristic wavelength which is guided by the layer 50 to the detector 51.

Figure 7:
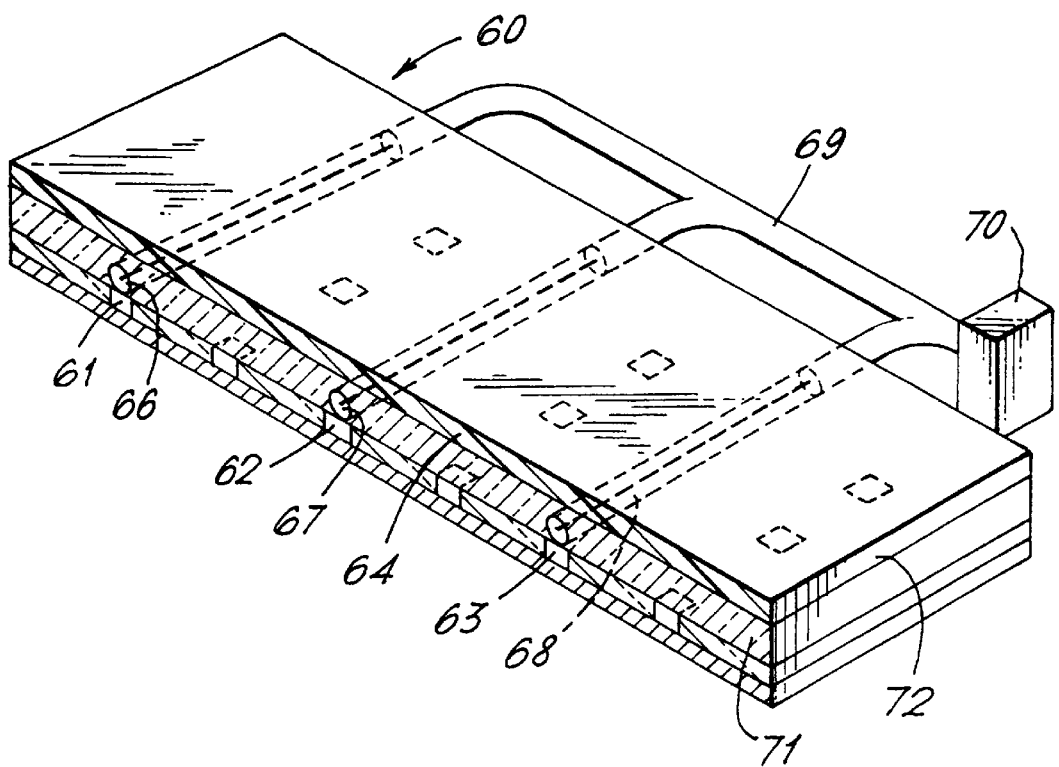
FIG. 7 is a perspective view of a sensor employing three differently doped fibres each directing light from several triboluminescent materials to a single detector.

FIG. 7 shows a composite layer material 60 in which several TL crystals 61, 62, 63 are embedded in rows within a layer 64. Optical fibres 66, 67, 68 containing photo excitable dyes are in optical contact with these rows of crystals 61, 62, 63 and connect via an optical fibre network 69 to one or more detectors 70. The fibres 66, 67, 68 are embedded in an optically transparent layer 71 and covered with a protective layer 72 of composite fibre. As before the crystals 61, 62, 63 may be one of the europium complexes eg europium tetrakis (dibenzoylmethide) triethylammonium (TDE) complex the fibres 66, 67, 68 maybe glass single or multi mode fibres, or polymer fibres; the glues may be RS [TM] bipax epoxy, Araldite [TM] fast setting, or Norland UV curing flues.

In a modification of FIG. 7 an addition set of differently doped optical fibres is arranged in columns so that an x,y matrix of differently doped optical fibres lies within a composite material. The column fibres are connected to one or more detectors as in FIG. 7. Signals from these two detectors indicate where in the matrix, light is being received.

FIGS. 8, 9 and 10 are specific examples used to obtain results as in FIGS. 11, 12.

EXAMPLE 1

FIG. 8, device with crystal bonded to a fibre.

A crystal 80 or crystals of the triboluminescent material europium tetrakis dibenzoylmethide triethylammonium (TDE) prepared by the method of Hurt et al, Nature, Vol 212, (1966), p 179 form crystals of approximately 1×1.5×3 mm dimensions. These crystals 80 can be attached to the end of an optical fibre 81 using an epoxy glue such as Araldite (TM), RS bipex or a UV curing glue. The glues should be allowed to set over night to form a brittle structures, but a few hours of curing is adequate for measurements. In this case the optical fibre 81 is polymer based such as that supplied by RS Components, number 368 047. In this example the fibre 81 is mounted on the surface of a plastic block 82, but it could be embedded within or on a composite structure.

The opposite end of the polymer fibre to the one with the triboluminescent crystals is coupled to the front surface of an optical diode 83. This is achieved by using a single-way optical plug 84 RS component 456-598 which is connected to the fibre 81 and then push fitted into a housing 85, RS component 456 605. The fibre housing 85 is placed centrally over the optical diode 83 so that any transmitted light will fall directly onto the diode surface. Once correctly placed on the diode 83 the housing 85 is glued to the surface using an epoxy glue. The optical diode 83 should be chosen to be sensitive to the wavelength of the particular triboluminescent emission, which for the TDE material is near 612 nm. In this case RS Component 303–719 was chosen.

The voltage output of the diode is connected to an amplifier circuit 86 whose output is connected to an oscilloscope 87 in order to record any emissions from the triboluminescent material 80. The oscilloscope 87, such as Hewlett-Packard 54600 A, is set up in a manner to trigger for any change in the voltage output of the optical diode 83. Measurements of the output from the optical diode are made in dark room conditions with the voltage of the amplifier 86 initially set to zero for no triboluminescent signal.

When a force is applied to the TDE crystal 80 or crystals, such as that imparted by dropping a small metal sphere onto them with an impact energy of a few milli-joules, fracture occurs. During fracture light is emitted from the TDE crystals. The light emitted is transmitted via the polymer fibre 81 to the optical diode 83 via the mounted coupler. The output from the optical diode is amplified and this voltage triggers the oscilloscope 97.

An example trace is shown in FIG. 11. The triggering of the oscilloscope 87 indicates that impact damage has occurred and therefore such an optical arrangement can be used as a means to detect damage.

EXAMPLE 2

FIG. 9, crystals embedded in plastic with optical fibre in the plastic.

Using the same optical arrangement as in example (1), impact or damage can be monitored by detecting triboluminescent emissions. In this example, instead of directly coupling the triboluminescent crystal to the fibre 81 several triboluminescent crystals 88 are embedded within an optically transparent slab 89 of glue or resin of, for example, epoxy, Araldite or RS bipax glue. In this example the transparent slab 89 was of the order of 3×1×0.5 cm dimensions.

The polymer fibre as in example 1 is optically coupled to this slab 82 either during its curing or with the use of optical cements (such as the Norland range of UV-curing glues). It is preferable that the glue is allowed to cure for 24 hours before use in order to become totally brittle, but a few hours cure is adequate for measurements. Such an optical arrangement of FIG. 9 can be used to monitor impact or damage to the glue by monitoring the emissions from the triboluminescent crystals 88. The arrangement could also be embedded within or on a composite structure.

When the glue or resin 89 is fractured, as discussed in example 1, fracture also occurs to the triboluminescent crystals 88. The light generated from the fracture of the crystals 88 is guided within the transparent slab 89 and detected by the optical diode 83. The output from the diode's amplifier circuit 86 triggers the oscilloscope 87 in the same manner as example 1. The amount of energy required to fracture the glue or resin slab 89 will depend on the particular glue or resin's physical properties, but impact energies in the 1–100 Joule range would be expected to cause damage. In this manner impact or damage to a structure could be detected by monitoring triboluminescent emissions.

EXAMPLE 3

FIG. 12, optical detector connected direct to a slab encapsulating triboluminescent crystals.

Using a different optical arrangement to examples 1 and 2 above, triboluminescent crystals 88 of TDE were embedded within an epoxy or other brittle glue slab 89. The glues are best allowed to cure for 24 hours to form brittle structures, but a few hours is adequate in order to make measurements. In this example the dimensions of the transparent slab were about 3×1×0.3 cm. Impact measurements can be monitored directly from the slab, alternatively the optical slab 89 could be embedded within a composite structure or mounted on its surface.

A flat vertical surface of the edge of the slab 89, about 1 cm away from the position of the embedded crystals 88 is optically coupled to the surface of a linear diode array (16 pixels) 90 using a Norland UV curing glue. An example of such a linear array 90 is RS Component 194-060. The optical pixels were wired in such a manner that the whole array 90 was used to detect emissions. This linear array 90 was connected to the amplifier circuit 86 and oscilloscope 87 discussed in example 1 above.

When sufficient force is applied to the glue slab 89 to induce its fracture, fracture also occurs to the triboluminescent crystals 88, with the emitted light guided through the transparent slab 89 to the diode array 90. The output from the amplifier circuit 86, triggers the oscilloscope 87, indicating that an impact or damage has occurred to the glue slab 89. An example of a trace of the emission is shown in FIG. 12.

We claim:

1. A damage sensor in combination with a structure (2) requiring damage detection comprising at least one triboluminescent material element (3) located at an area of the structure (2) requiring damage detection and at least one light detector (8) together with light guiding means (7) connecting between the element (3) and the detector (8), the arrangement being such that both location and amount of hidden damage between a predetermined known threshold value and observable failure of the structure may be determined.

2. The damage sensor of claim 1 wherein the elements (3) are of different triboluminescent materials having different emission characteristics arranged at different areas of the structure (2).

3. The damage sensor of claim 1 wherein the element (3) is arranged within a cavity (4) in the structure (2).

4. The damage sensor of claim 1 wherein the element (3) is mounted on a surface of the structure (2).

5. The damage sensor of claim 1 wherein the light guiding means (7) is at least one optical fibre.

6. The damage sensor of claim 1 wherein the light guiding means is a layer (31) of a light guiding material contained between two layers (32, 33) of materials of higher refractive index than the light guiding layer.

7. The damage sensor of claim 1 wherein the light guiding means is an optical fibre (7) doped with a dye photo excitable by emission from the triboluminescent material element (3).

8. The damage sensor of claim 1 wherein several optical fibres (7) each with differently doped dyes connect with detectors (8).

* * * * *